(12) United States Patent
Gorumlu et al.

(10) Patent No.: US 12,330,347 B2
(45) Date of Patent: Jun. 17, 2025

(54) METHODS AND SYSTEMS FOR MAKING TILTED AND CURVED STRUCTURES WITH HIGH ASPECT RATIOS

(71) Applicant: Texas Tech University System, Lubbock, TX (US)

(72) Inventors: Serdar Gorumlu, Lubbock, TX (US); Burak Aksak, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 464 days.

(21) Appl. No.: 17/268,428

(22) PCT Filed: Aug. 14, 2019

(86) PCT No.: PCT/IB2019/056902
§ 371 (c)(1),
(2) Date: Feb. 12, 2021

(87) PCT Pub. No.: WO2020/035805
PCT Pub. Date: Feb. 20, 2020

(65) Prior Publication Data
US 2021/0347092 A1    Nov. 11, 2021

Related U.S. Application Data

(60) Provisional application No. 62/718,591, filed on Aug. 14, 2018.

(51) Int. Cl.
B29C 33/38    (2006.01)
B29C 39/02    (2006.01)
(Continued)

(52) U.S. Cl.
CPC ........ *B29C 33/3878* (2013.01); *B29C 39/026* (2013.01); *B29C 39/26* (2013.01);
(Continued)

(58) Field of Classification Search
CPC ............................ B29C 33/3878; B29C 39/38
See application file for complete search history.

(56) References Cited

U.S. PATENT DOCUMENTS 5,343,548 A     8/1994   Hall et al.
7,709,087 B2 *  5/2010   Majidi ...................... C09J 7/00
                                                         428/401

(Continued)

OTHER PUBLICATIONS

International Search Report and Written Opinion, PCT/IB19/56902, Jan. 17, 2020, 10 pgs.

*Primary Examiner* — Andrew D Graham
(74) *Attorney, Agent, or Firm* — LOZA & LOZA, LLP; Kevin L. Soules

(57) ABSTRACT

A method, system, and apparatus for an improved gripping device comprises a substrate and a curved microplate formed on the substrate. In certain embodiments, the system further comprises an array of curved microplates formed on the substrate further comprising a plurality of aligned rows of the curved microplates formed on the substrate and a plurality of aligned columns of the curved microplates formed on the substrate. The curved microplate has a gripping direction, being substantially opposite the direction of the curve in the curved microplate and the curved microplate has a releasing direction, substantially in line with the direction of the curve in the curved microplate.

6 Claims, 10 Drawing Sheets

(51) Int. Cl.
  *B29C 39/26* (2006.01)
  *B29C 39/38* (2006.01)
  *B29L 31/00* (2006.01)

(52) U.S. Cl.
  CPC ......... *B29C 39/38* (2013.01); *B29L 2031/756* (2013.01); *B29L 2031/757* (2013.01)

(56) References Cited

U.S. PATENT DOCUMENTS

| | | | |
|---|---|---|---|
| 7,709,807 B2* | 5/2010 | McClelland | H01J 37/08 250/423 P |
| 8,251,163 B2 | 8/2012 | Xie et al. | |
| 2003/0040031 A1* | 2/2003 | Kim | G01N 33/5029 382/133 |
| 2003/0166279 A1* | 9/2003 | Sabbadini | C40B 40/02 435/325 |
| 2003/0208888 A1* | 11/2003 | Fearing | B81B 3/0059 24/442 |
| 2007/0187864 A1* | 8/2007 | Mincey | B29C 33/40 264/219 |
| 2007/0292837 A1* | 12/2007 | Deutsch | B29C 65/002 435/174 |
| 2008/0106001 A1* | 5/2008 | Slafer | B29C 33/38 425/142 |
| 2009/0043279 A1* | 2/2009 | Kaspar | A61K 9/0021 604/506 |
| 2009/0281250 A1* | 11/2009 | DeSimone | B29C 66/71 427/508 |
| 2010/0021647 A1 | 1/2010 | Sitti et al. | |
| 2010/0129611 A1 | 5/2010 | Sugimoto et al. | |
| 2010/0129908 A1* | 5/2010 | Fang | C12N 5/067 435/395 |
| 2014/0363610 A1* | 12/2014 | Sameoto | B29C 43/003 428/92 |
| 2018/0333899 A1* | 11/2018 | Francis | B29C 33/3857 |
| 2020/0147840 A1* | 5/2020 | Lan | C08G 63/127 |

* cited by examiner

900

METHODS AND SYSTEMS FOR MAKING TILTED AND CURVED STRUCTURES WITH HIGH ASPECT RATIOS

TECHNICAL FIELD

Embodiments are generally related to the field of tilted structures, including, but not limited to, micro/nano structures. Embodiments are also related to curved micro/nano structures. Embodiments are further related to structures formed to improve grip. Embodiments are also related to fabrication of such structures. Embodiments are further related to methods and systems for making tilted and/or curved micro/nano structures with high aspect ratios.

BACKGROUND

Adhesive materials which do not rely on liquids or pressure differentials are highly coveted in disciplines ranging from electronic assembly to vehicle construction. For example, computer chip manufacturing requires clean-room handling to prevent contamination. Synthetic adhesive materials enable fabrication in clean room scenarios where clean grasping is required. Additionally, for certain application directional gripping may be desirable for fast and damage free handling and transportation of fragile parts such as computer chips Currently, synthetic fibers utilize stems with an angled edge to grasp objects. However, these devices are limited because the lithographic techniques used for their fabrication are limited. One such limitation is the angle of vertical alignment. Using present technology, vertical alignment angles larger than 30 degrees result in a loss of uniform fabrication over the area.

Additionally, current synthetic fibers are generally constructed from soft materials. Soft materials are selected for their adhesive performance. However, softer materials also result in decreased material durability.

Accordingly, there is a need for systems and methods, that can be used to provide tilted and/or curved micro/nano structures with high aspect ratios, with anisotropic adhesive properties, where the synthetic adhesive grips strongly in a preferred direction and releases easily in another, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide tilted and curved structures.

It is another aspect of the disclosed embodiments to provide structures formed to improve grip.

It is another aspect of the disclosed embodiments to provide methods for fabrication of such structures.

It is another aspect of the disclosed embodiments to provide methods and systems for making tilted and/or curved micro/nano structures with varying aspect ratios ranging from low to high.

It will be appreciated that the methods and systems can be achieved according to the embodiments disclosed herein. In one such embodiment, a system, method, and/or apparatus comprises a fabrication method comprising forming a master mold; deforming fibers in the master mold into a selected shape; curing the master mold; removing fibers from the master mold; casting fibers from the master mold; curing the fibers cast from the master mold, and removing the cast fibers from the master mold, the cast fibers comprising a microplate. The fabrication method further comprises aligning a microscope stage with the microplate. Deforming the fibers in the master mold further comprises at least one of: normal deformation; and transverse deformation. In some embodiments, forming the master mold comprises forming an array of fibers comprising a microplate array.

In an embodiment, a fabrication method comprises forming a master mold, deforming fibers in the master mold into a selected shape, removing fibers from the master mold, casting fibers from the master mold, and removing the cast fibers from the master mold, the cast fibers comprising a microplate. In an embodiment, the method further comprises aligning a microscope stage with the microplate.

In an embodiment, deforming the fibers in the master mold further comprises at least one of normal deformation and transverse deformation. In an embodiment, the method further comprises curing the master mold. In an embodiment, forming the master mold comprises forming an array of fibers comprising a microplate array. In an embodiment, the method further comprises curing the fibers cast from the master mold.

In another embodiment a gripping system comprises a substrate and a curved microplate formed on the substrate. In an embodiment, the gripping system further comprises a plurality of the curved microplates formed on the substrate. In an embodiment, the gripping system further comprises an array of the curved microplates formed on the substrate. In an embodiment, the gripping system further comprises the array of the curved microplates formed on the substrate further comprises a plurality of aligned rows of the curved microplates formed on the substrate and a plurality of aligned columns of the curved microplates formed on the substrate.

In an embodiment, the gripping system further comprises a crack tip associated with the curved microplate wherein the crack tip experiences a positive moment during peeling and a negative moment during sliding. In an embodiment, the curved microplate is formed of polyurethane. In an embodiment, the curved microplate has a gripping direction, the gripping direction being substantially opposite the direction of the curve in the curved microplate. In an embodiment, the curved microplate has a releasing direction, the releasing direction being substantially in line with the direction of the curve in the curved microplate.

In yet another embodiment, a gripping method comprises configuring a system comprising a substrate with at least one curved microplate formed thereon, applying the system to a target substrate, and sliding the system in a gripping direction while the system is in contact with the target substrate. In an embodiment, the at least one curved microplate further comprises an array of curved microplates wherein the array of the curved microplates formed on the substrate further comprises a plurality of aligned rows of the curved microplates formed on the substrate and a plurality of aligned columns of the curved microplates formed on the substrate.

In an embodiment, the gripping method further comprises imparting a positive moment on a crack tip associated with the curved microplate during peeling. In an embodiment, the gripping method further comprises imparting a negative moment on a crack tip associated with the curved microplate during sliding. In an embodiment, the gripping direction is substantially opposite the direction of the curve in the curved microplate. In an embodiment, the curved microplate has a releasing direction, the releasing direction being substantially in line with the direction of the curve in the curved microplate.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
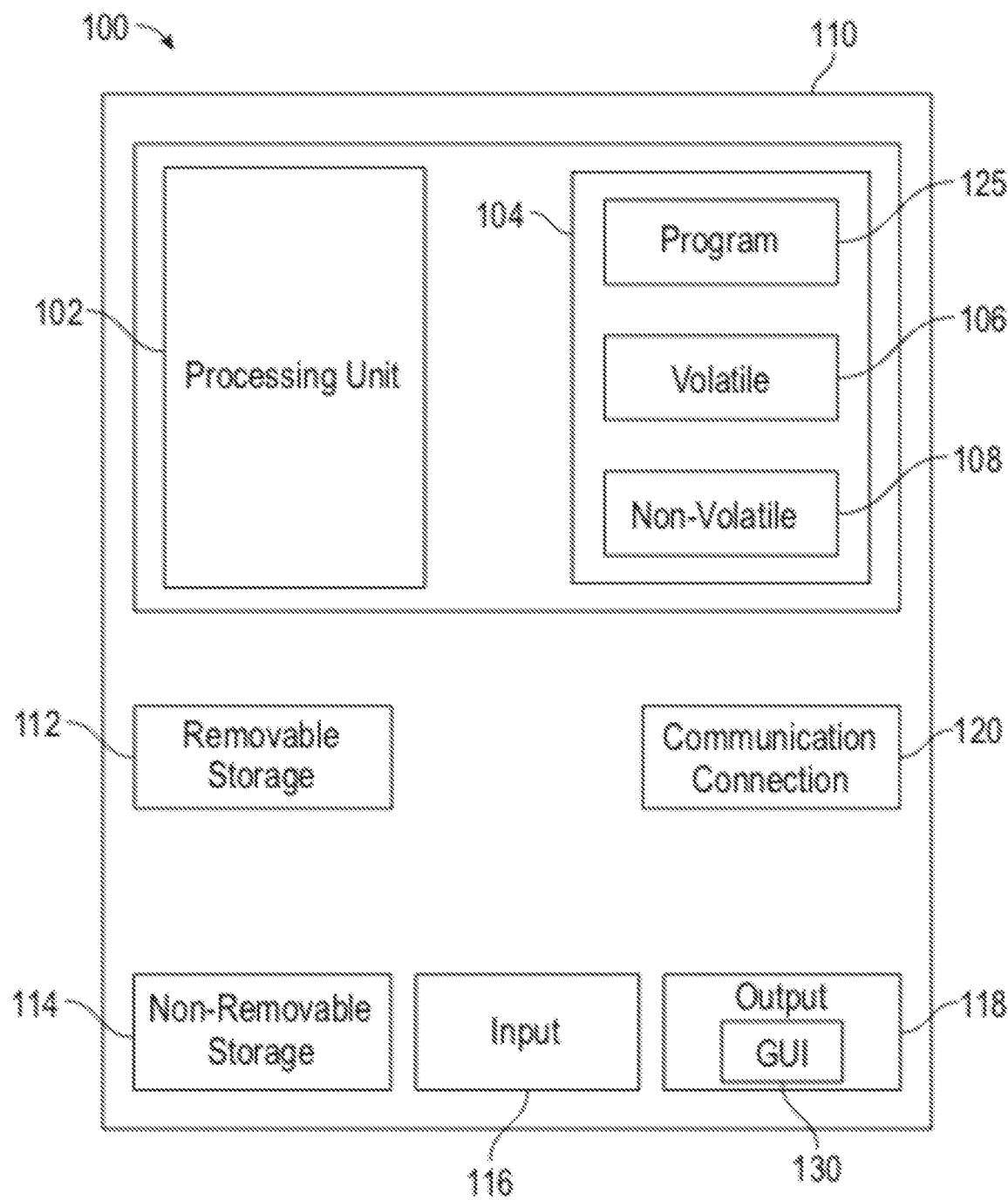
FIG. 1 depicts a block diagram of a computer system which is implemented in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
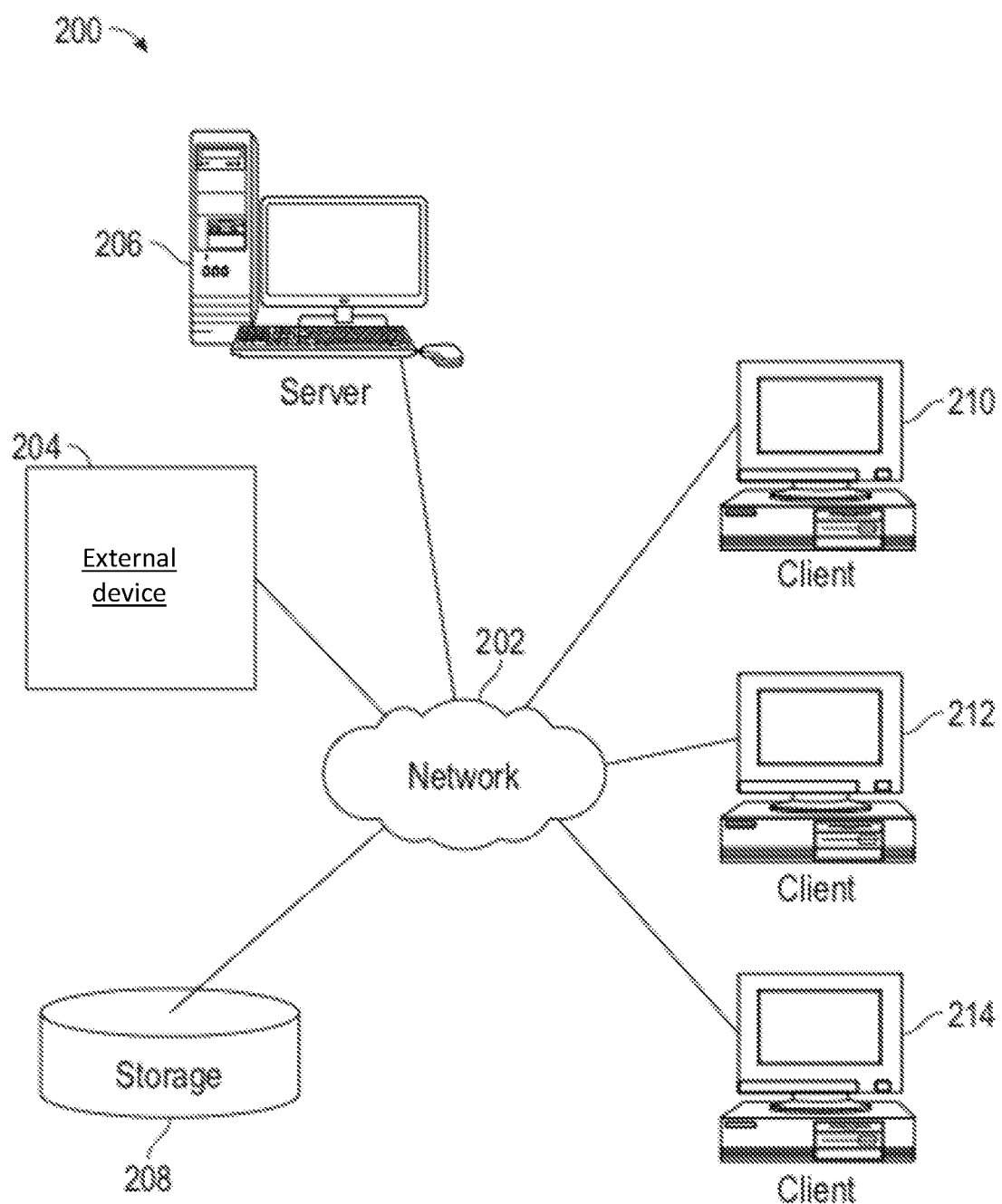
FIG. 2 depicts a graphical representation of a network of data-processing devices in which aspects of the present embodiments may be implemented.
Figure 3:
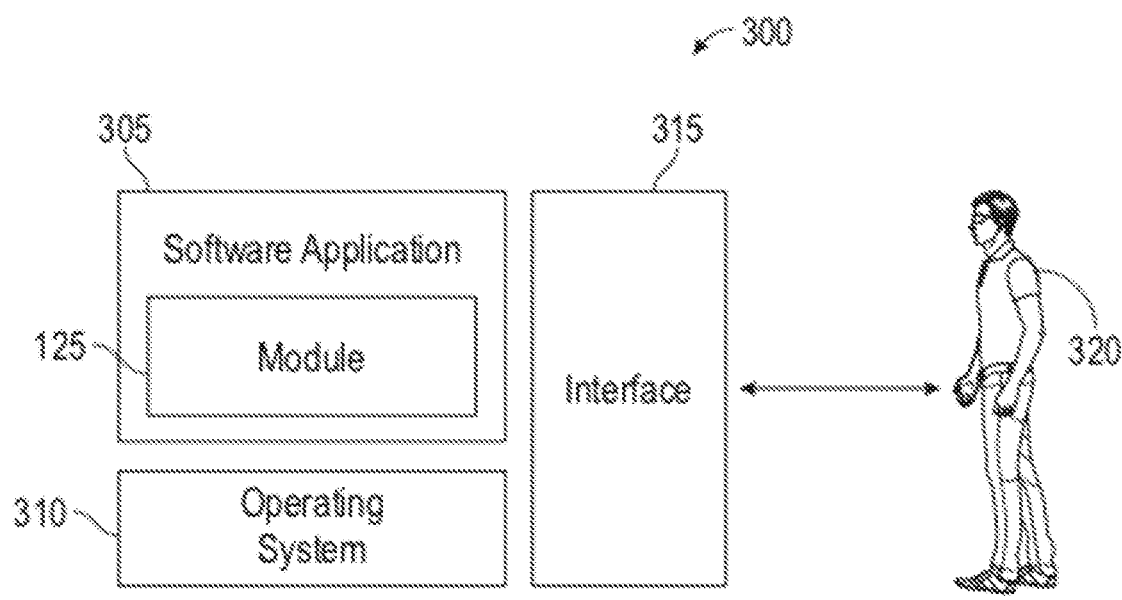
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RANI), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, or other such device.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, micro-processor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to a curved micro and/or nano structure comprised of a material (e.g., polyurethane, or other such castable material) with intrinsic stiffness, beyond that of currently used materials. One key aspect of the embodiments disclosed herein is that they provide very high friction but can also be removed easily. In other words, the shear is much higher than pull-off stress. As illustrated in the figures provided herein, in some embodiments, the methods and systems provide structures with roughly 40 times more shear than pull-off force.

While many of the embodiments disclosed herein are directed to micro or nano scale structures, it should be appreciated that the embodiments can include structures, and methods to fabricate structures of any scale. The use and description of micro and/or nano scale structures is meant to be exemplary. This embodiments include fabrication methods that result in structures that possess superior adhesive properties, exhibiting gripping friction up to 7 times greater than the friction in the releasing direction and up to 40 times greater than the normal direction.

Figure 4:
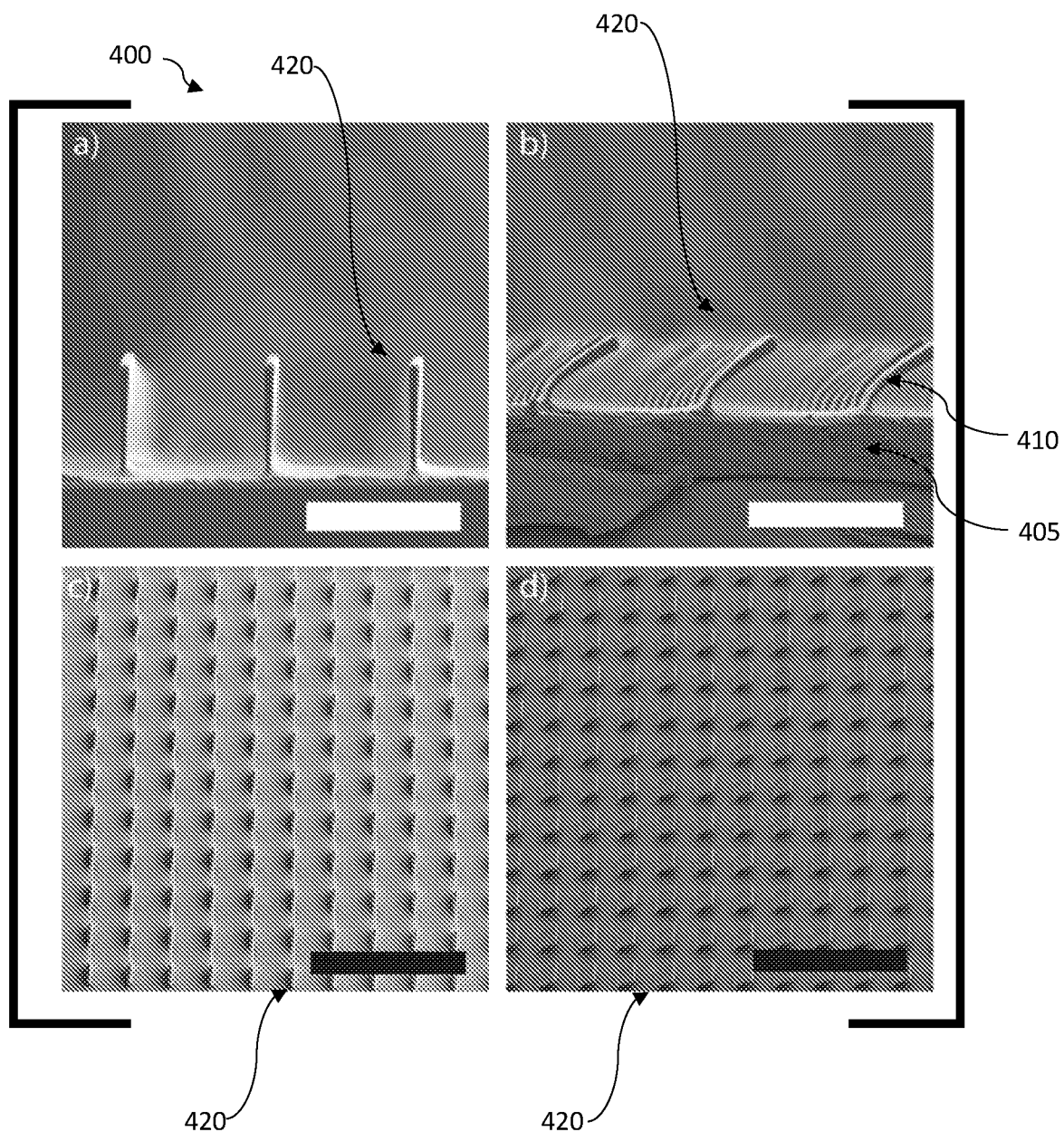
FIG. 4 depicts an illustration of a tilted micro structure in accordance with the disclosed embodiments.

FIG. 4 illustrates scanning electron microscope images 400 of vertically aligned and curved microplate arrays 420, in accordance with the disclosed embodiments. As illustrated, the embodiments can comprise a lower substrate 405 with a plurality of aligned and curved microplates 410 configured thereon. The microplate array 420 provides dramatic improvement in grip.

More specifically, the frictional force (or grip) resulting from contact between the curved microplates 420 and an external object is direction dependent. Thus, friction (which can be characterized using LDP data for varying relative normal displacements) can be large in the gripping direction and small in the releasing directions. The efficient grip in the gripping direction is due to the large contact surface area of the curved fibers (or microplates) 410 in the gripping direction.

The pull-off adhesion is an indication of a substantial contact area between the microplates 410 and the substrate being gripped, at the end of the drag phase. In certain aspects of the present embodiments, pull-off adhesion in the gripping direction can be up to 3 kPa, while pull-off adhesion in the releasing direction can be less than 0.5 kPa. This difference is due to the higher peel angle and the lower contact area at the end of the drag phase. Furthermore, the enhanced friction in the gripping direction with the curved microplates 410 is due to the adhesive interaction at the interface.

Figure 5A:
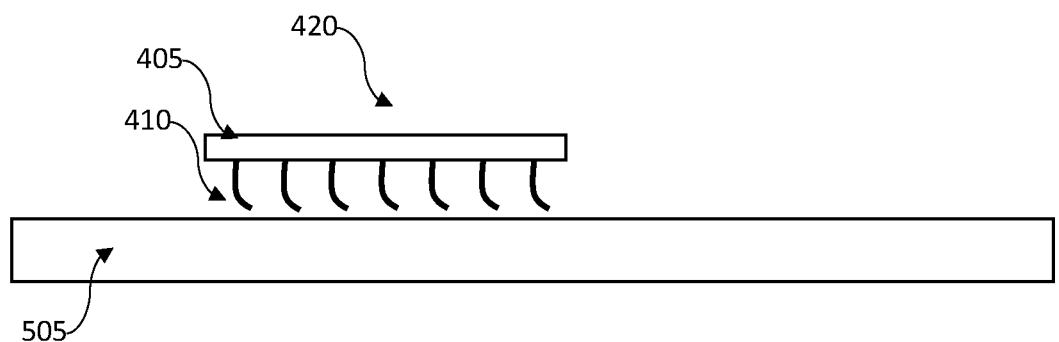
FIG. 5A depicts a gripping system, in accordance with the disclosed embodiments.
Figure 5B:
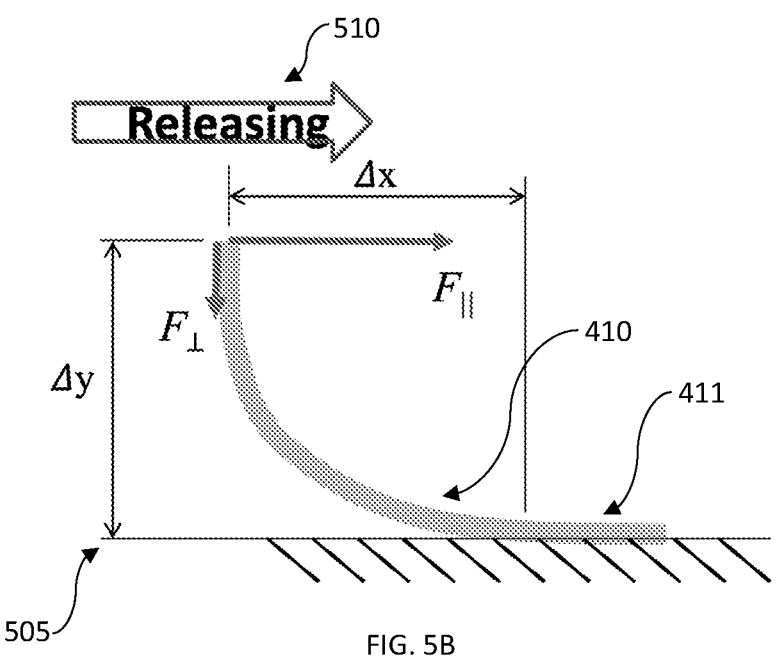
FIG. 5B depicts forces in the releasing direction associated with the gripping system, in accordance with the disclosed embodiments.
Figure 5C:
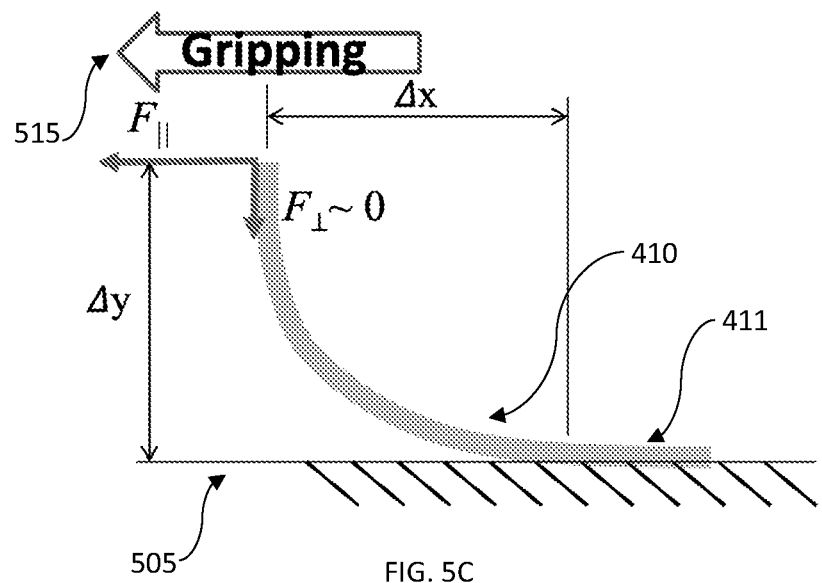
FIG. 5C depicts forces in the gripping direction associated with the gripping system, in accordance with the disclosed embodiments.

FIGS. 5A-5C illustrate the improved gripping achievable with the systems disclosed herein and in accordance with the disclosed embodiments. In certain embodiments, substrate 505 can be the target substrate. A microplate array 420 can comprise a base substrate 405 and at least one curved microplate 410 configured thereon. In certain embodiments, the microplate array 420 can comprise multiple curved microplates 410, configured in alignment. It may be preferable to form equally spaced rows and columns of curved microplates 410 as illustrated in FIG. 5A.

FIG. 5B illustrates the forces associated with a microplate 410 in the microplate array 420. The releasing direction is illustrated by arrow 510. When the microplate 410 is "peeled" away from the target substrate 505, the moment at the crack tip 411 of the microplate 410 is given by Equation (1) as follows during a peeling motion:

$$M_f = F_\parallel \Delta y - F_\perp \Delta x \qquad (1)$$

When the force perpendicular to the plane of the substrate 505 (given by $F_\perp$) is much smaller than the force parallel to the plane of the substrate 505 (given by $F_\parallel$), the Moment (given by $M_f$) will be positive and the crack tip will give way. This can be realized in a "peeling" movement.

By contrast, the gripping direction is illustrated by arrow 515. When the microplate 410 "slides" with the target substrate 505, the moment at the crack tip 411 of the microplate 410 can be given by Equation (2) as follows during a sliding motion:

$$M_f = -F_\parallel \Delta y \qquad (2)$$

In this case, the force perpendicular to the plane of the substrate 505 (given by $F_\perp$) is at or near 0 N, but the force parallel to the plane of the substrate 505 (given by $F_\parallel$) is negative. As such, the Moment (given by $M_f$) will be negative and the crack tip will close, providing an extraordinarily strong "grip" on the substrate 505. This can be realized in a "sliding" movement.

Figure 6:
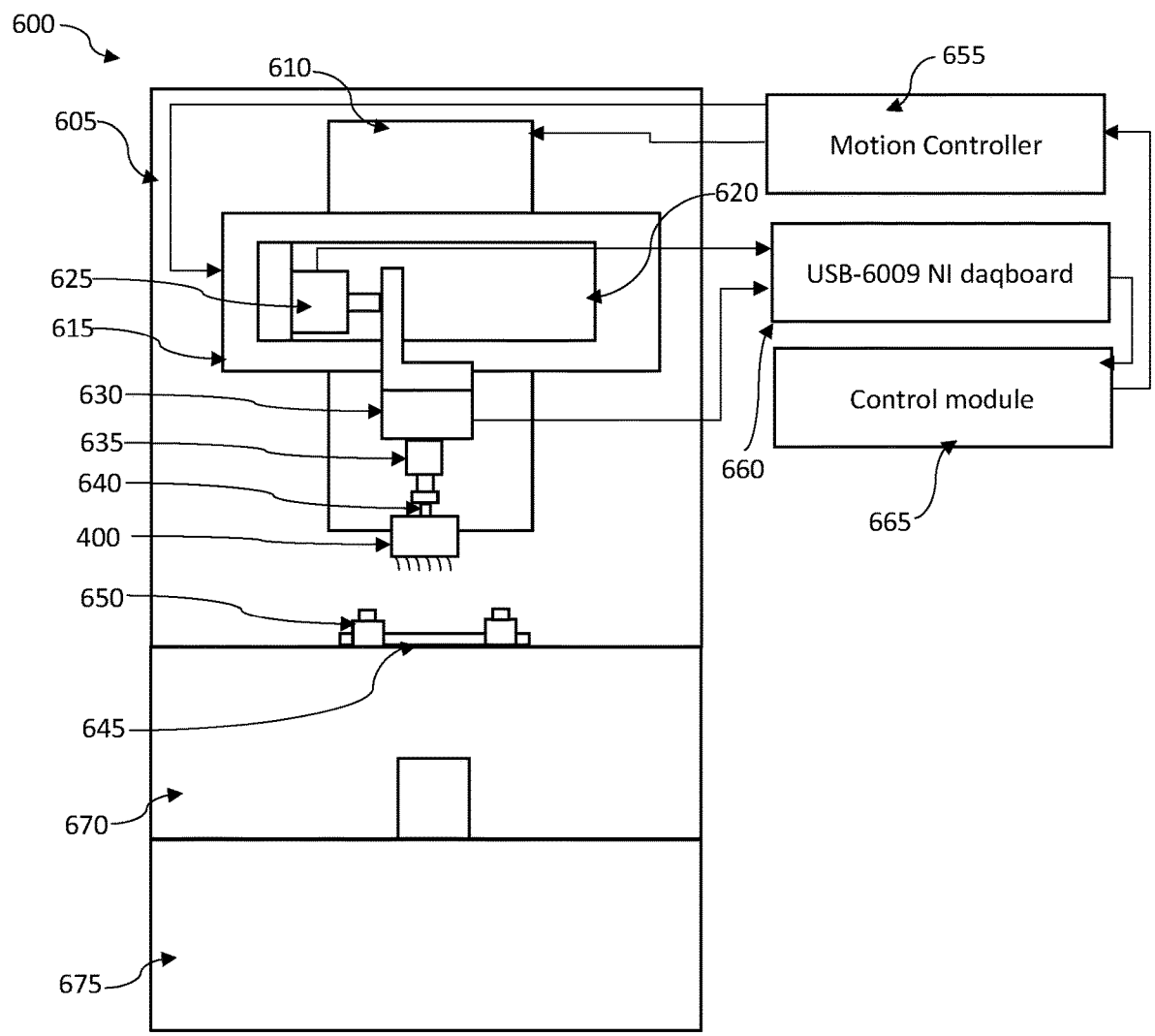
FIG. 6 depicts a block diagram of a fabrication system in accordance with the disclosed embodiments.

FIG. 6 illustrates a system 600 for fabricating a curved microplate array. The system 600 is mounted on a vertical mounting block 605. A vertical movable stage 610 and horizontal movable stage 615 can be connected to a motion controller 655. The motion controller 655 is configured to provide precise horizontal and vertical adjustments to position of the load cell mounting block 620, formed on the normal force load cell 625 and the parallel force load cell 630. The normal force load cell 625 and the parallel force load cell 630 are operably connected to a data acquisition board 660 (e.g. USB-6009 NI daqboard or another equivalent component). It should be noted that a control module 665 can be connected to the data acquisition board 660. The control module 665 can comprise software, which can be executed with a computer system and network as illustrated in FIGS. 1-3 above, and can comprise a control system such as control systems designed in LabVIEW®. The control module 665 receives input from the data acquisition board 660, and provides control output to the motion controller 655.

The load cells are connected to the load cell stem 635. The load stem cell 635 connects to a peg 640. The peg 640 connects the load cells to the curved microplates 400. Note that the curved microplate 400 includes the curved microplate array.

In certain embodiments the workpiece 645, which needs to be gripped (or in other cases comprises a test substrate), can be connected to the mounting block 605 with substrate clamps 650. In certain embodiments, the microscope stage 670 can be connected to a microscope 675 as necessary for fabrication methods disclosed herein.

Figure 7:
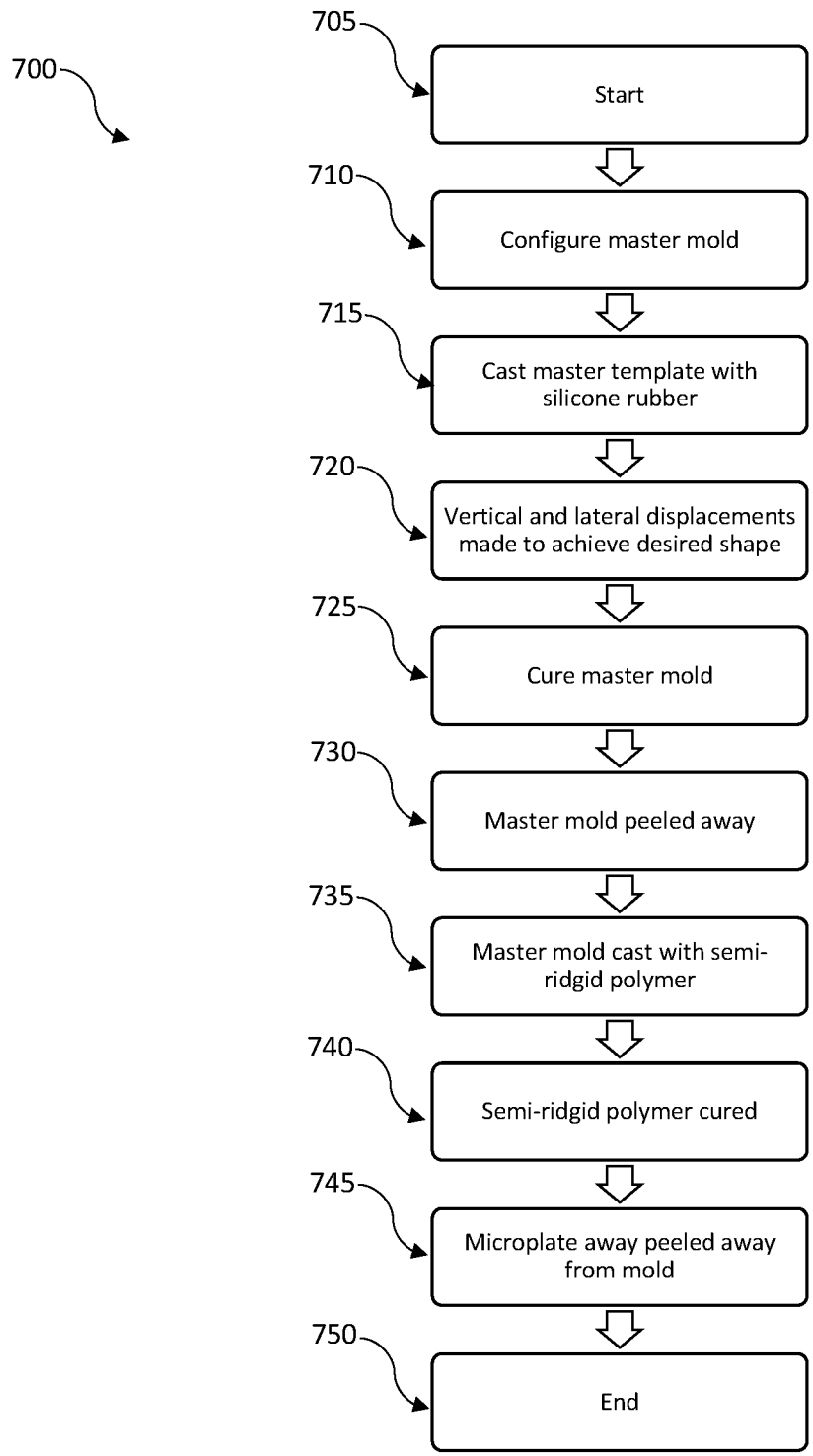
FIG. 7 depicts a flow chart of a method for fabricating a tilted micro structure in accordance with the disclosed embodiments.

FIG. 7 illustrates a method 700 for fabricating tilted and curved structures which are based on the already-fabricated vertically aligned structures, using the system 600. In the method 700, vertically aligned microplates are deformed with high precision to obtain the desired shape in tandem with the fabrication of a negative complementary mold. The method 700 results in an array of curved microplates, generated from vertically aligned microplates.

The method begins at 705. At step 710 a master template of the desired microplate array is fabricated from silicon, most commonly using Deep-Reactive-Ion-Etching, or other such methods. The master template is cast with silicone rubber (e.g., MoldMax 20, Smooth On, or other such castable material) as shown at 715, which forms the master mold. It should be understood that the embodiments disclosed herein are not limited to silicone rubber. In other embodiments, other castable materials can be used. The material selection may be constrained because, even though any polymer can be used for both the curved fiber and the mold, the material can be selected such that they do not bond. In embodiments where the selected materials do bond, the mold can be etched away, but may also be limited to a single use.

In certain embodiments, a small amount of silicone rubber (or other such castable material) is poured on a glass slide and flattened using a draw-down bar to provide a uniform layer. The vertical stage is brought down in small increments (e.g. 1 µm, or other desired increments) until contact occurs with the glass substrate. At step 720, both vertical and lateral displacements are made to obtain the desired curved shape in the microplates. It should be appreciated that many different shapes can be achieved according to this method, but, the large beam deflection theory needs to be employed in order to determine the exact shape of the microplate based on the vertical and lateral tip displacements.

The master mold is cured at step 725 for approximately 24 hours at room temperature. After curing, at step 730, the mold can be peeled away to form the silicon microplate array master mold.

Next, the master silicone rubber mold is cast with a semi-rigid polyurethane (e.g. TC 9445, BJB Enterprises, or other such castable material) as shown at 735. It should be appreciated that the methods and systems disclosed herein include, but are not limited to, the use of polyurethane. In other embodiments, the methods and systems can make use of any castable material. The master mold is thus used to generate the curved fibers. The polymer is cured at 740 and the curved fiber array can then be peeled off the mast mold as shown at 745. The method ends at 750.

Figure 8:
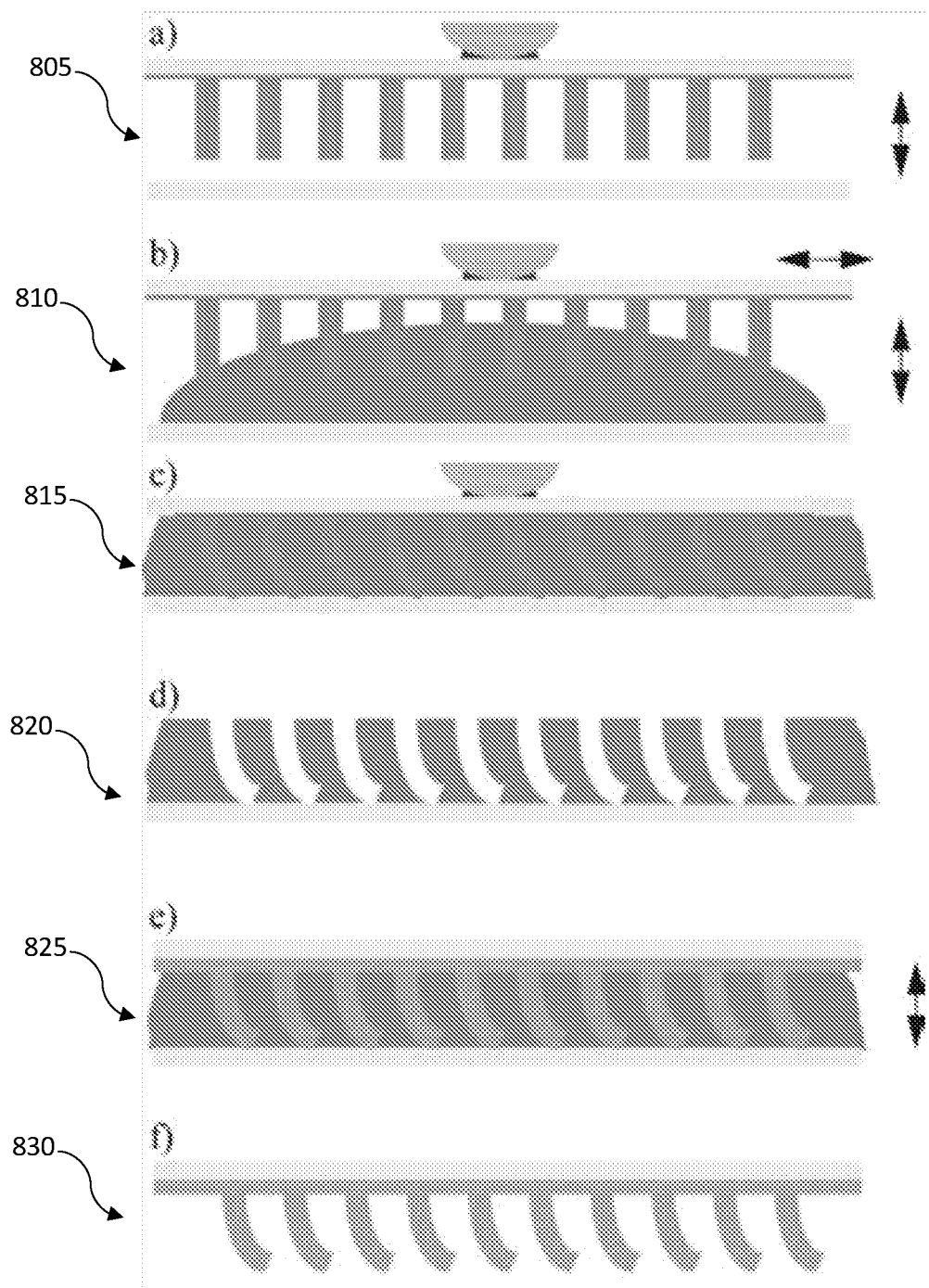
FIG. 8 depicts a flow chart of a method for fabricating a tilted micro structure in accordance with the disclosed embodiments.

FIG. 8 provides a graphical illustration of an alternative embodiment of a method 800 for fabricating tilted and curved structures using the system 600.

As illustrated at step 805, the microplate array and glass slide are aligned. The alignment step is performed using a custom-built system, such as system 600. The system 600 includes an inverted microscope equipped with a manual XY positioning stage. Two goniometers can be used to control roll and pitch angles. Two precision linear stages are attached to the goniometer assembly and configured in YZ plane, where Z represents the up-and-down movement. Two load cells are used to measure force in the Z direction, and a load cell is used to measure force in Y direction, and is attached to the precision stages. The output from the load cells is captured using a USB-6009 data acquisition board (or other such data acquisition board) and the whole system, including the stage controllers are operated by a custom LabVIEW® control module that can control preload, contact time, and displacements and velocities in the YZ plane. The set-up is designed to control stage movements in two directions simultaneously, and records the data from two load cells. It also allows for visual inspection of the deformation of the microplate arrays.

During the alignment process 805, an acrylic peg with the vertically aligned microplates is placed onto the glass slide on the microscope, facing down, self-aligning with the slide. The initial self-alignment can be checked visually using the inverted microscope between the microplate array and glass slide. The precision stages are operated to get the load cell stem to contact the back of the acrylic peg. To prevent the microplates from buckling, the load cell can be brought down in steps, while the load cell output is checked at each step until contact is made. Then, a small droplet of glue can be applied to the area between stem and the back of the glass slide using needle-like tweezers. The glue is allowed to dry. The custom control module allows the stage to be brought up in the vertical direction so that contact is not required between the aligned microplates and the glass substrate.

At step 810 a small amount of silicone rubber (or other such castable material) is poured on the glass slide and flattened using a draw-down bar to provide uniform layer thickness. Next, the vertical stage is brought down in increments until contact occurs with the glass substrate, followed by both vertical and lateral displacements to obtain the desired curved shape in the microplates, at step 815. As previously noted, one can obtain many different shapes, however, the large beam deflection theory needs to be employed in order to determine the exact shape of the microplate based on the vertical and lateral tip displacements.

After desired shape is obtained, the silicone rubber (or other such castable material) is allowed to cure (e.g. for approximately 24 hours, or as necessary for the material being used) at room temperature (or other acceptable temperature) as shown at 820. The load stem cell is then lifted, and the fibers are peeled from the master mold for the curved microplate array, as illustrated at 820. The curved fiber array is cast and peeled away from the master mold, as illustrated at 825. The master mold can thus be used to fabricate curved microplates, as shown at 830, on acrylic pegs, with unique and specialized adhesion properties.

Vertically aligned and curved microplates fabricated using a semi-rigid polyurethane (TC-9445, BJB Enterprises, USA, or other such castable materials) with an elastic modulus of 126 MPa can be fabricated according to the methods and systems disclosed herein. As previously noted, microplates can be placed face down on a glass substrate to ensure the best possible alignment. Then, horizontal stages are used to adjust the alignment of the contact with the center of the acrylic peg. The vertical stage is brought down to contact the back of the peg. Once the contact is made, the stem of the load cell is glued to the back of the acrylic peg. This can be accomplished using needle-like tweezers. The glue is allowed to dry. The acrylic peg, glued to the stem of the load cell, is detached from the glass substrate using the vertical stage.

Tests were performed to determine the gripping properties of the curved microplates. In certain embodiments, a sample can be brought down to contact the glass substrate at 1 μm/s speed. Note that the stage displacement at which contact takes place can be recorded. Once contact takes place, the sample is displaced further towards the glass slide, the amount of which controls the initial compressive load. Once the desired relative displacement is reached, the second stage is activated which drags the sample across the glass substrate either in the direction of the tilt (i.e. the gripping direction), or against the tilt (i.e. the releasing direction) for 500 μm at 10 μm/s. Once dragging is completed, the sample is moved directly up and away from the glass substrate, completing the LDP test cycle.

Figure 9:
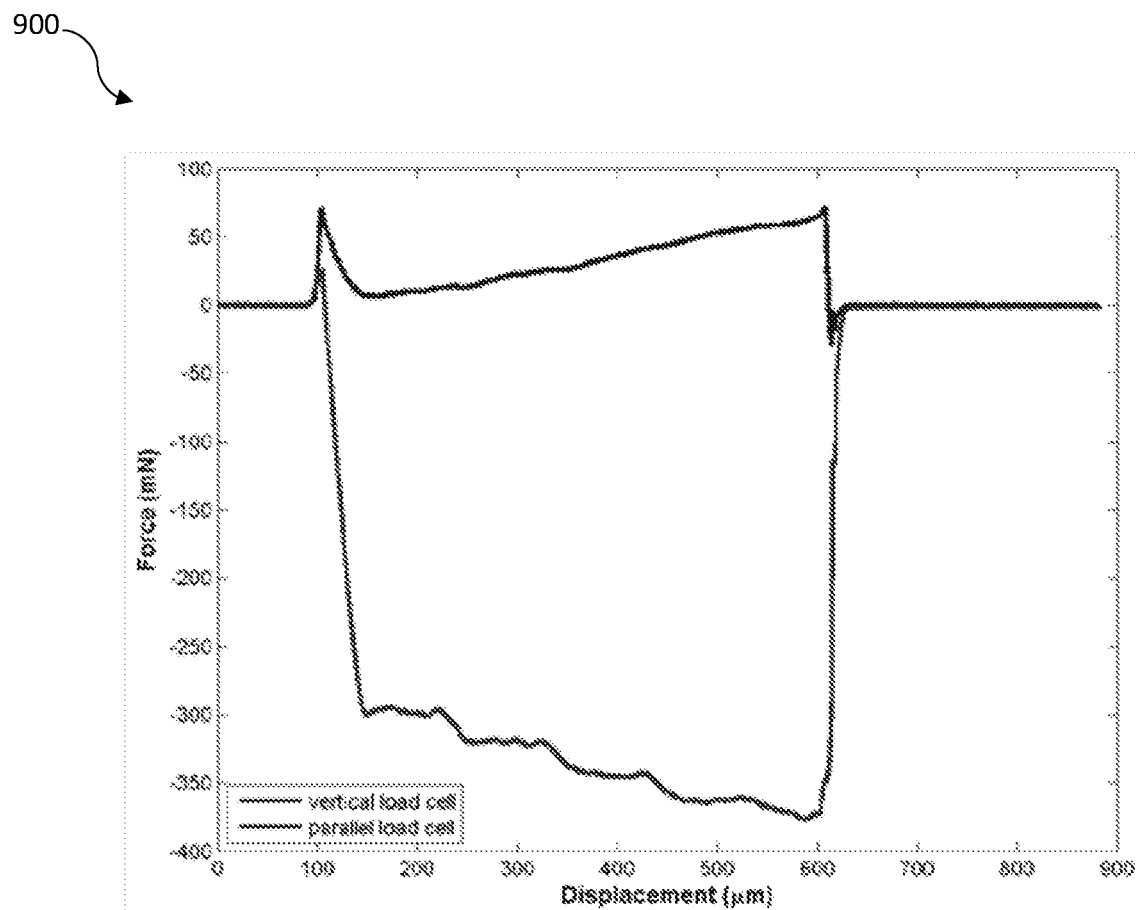
FIG. 9 depicts a chart in accordance with the disclosed embodiments.

Both the normal and shear forces, referred to herein as friction forces, were recorded with two 500-gr vertical and parallel load cells, respectively. The normal force and the friction force data are plotted against time to generate the LDP curves. FIG. 9 shows a chart 900 of sample LDP data for the curved microplate array, as disclosed herein, in the gripping direction. As illustrated by the chart, the sample exhibits high dynamic friction and close to zero normal force during sliding.

Figure 10:
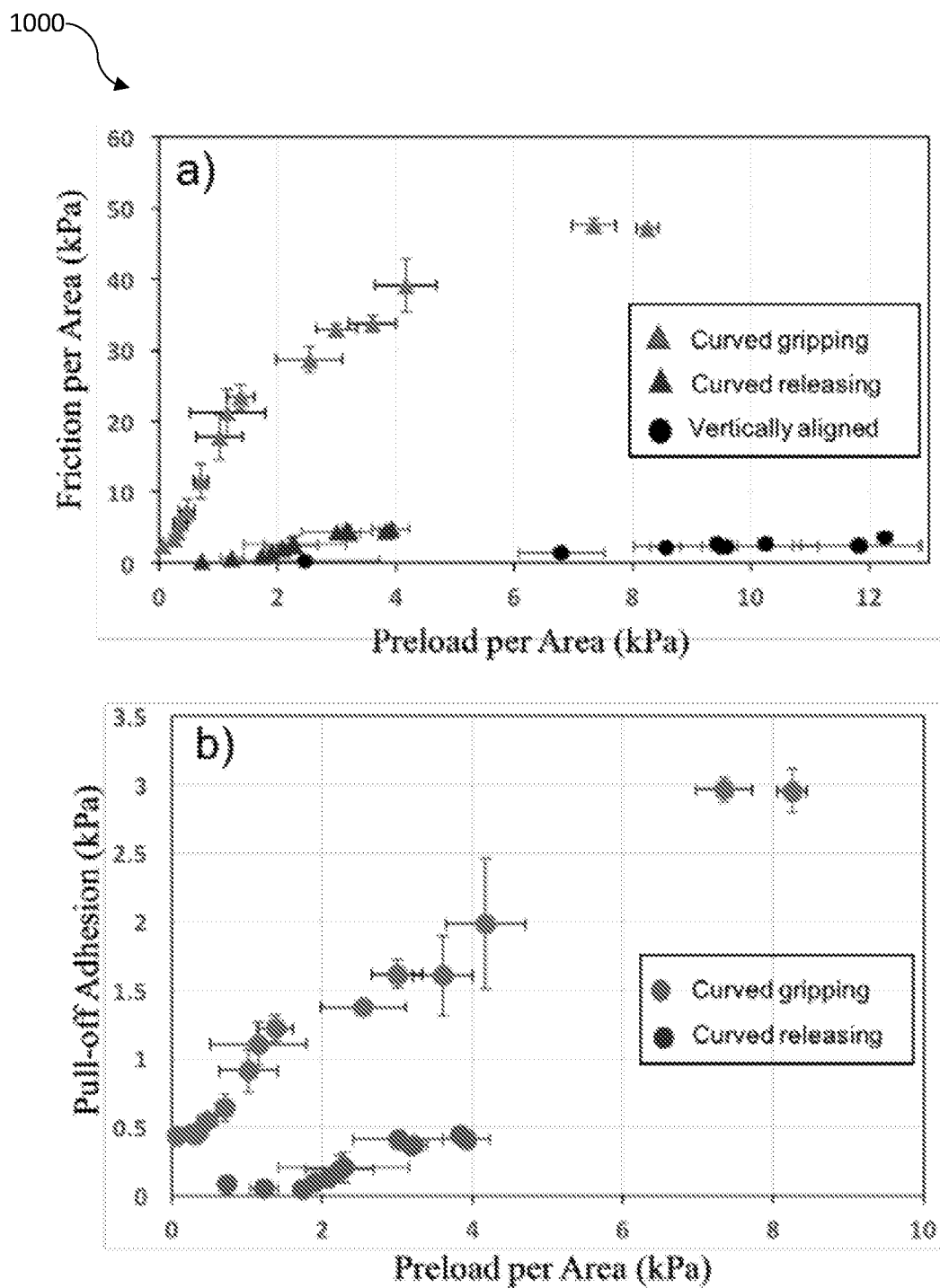
FIG. 10 depicts a chart in accordance with the disclosed embodiments.

The degree of direction dependent friction is characterized using the LDP data for varying relative normal displacements both in the gripping and the releasing directions. For reference, the LDP experiment was performed with the vertically aligned sample in one direction, as well. This efficiency is due to the large contact area of the curved fibers in the gripping direction as evidenced by the data shown in chart 1000 of FIG. 10. The pull-off adhesion is an indication of a substantial contact area between the microplates and the glass substrate at the end of the drag phase of the experiment. While no pull-off peak was detected for the vertically aligned microplates, pull-off adhesion of up to 3 kPa was recorded for the curved microplates in the gripping direction. Pull-off adhesion is capped at 0.5 kPa in the releasing direction, which is due to the higher peel angle and the lower contact area at the end of the drag phase. It is also interesting to note the similarity in trends between friction and pull-off adhesion. This similarity indicates that the reason for enhanced friction in the gripping direction with the curved microplates is due to the adhesive interaction at the interface.

In sum, curved and tilted fiber systems for enhanced gripping and systems and methods for fabrication of curved and tilted fibers are described herein. The embodiments allow for precise control of the fiber shape and eliminate constraints associated with current complex and expensive fabrication techniques. Curved microplates, fabricated using the developed technique, exhibit directional friction. In the gripping direction they exhibit the highest friction. The ratio of friction in the gripping-to-releasing direction can reach as high as 40, indicating a very high directional dependency. Easy release is an important quality for the semiconductor industry where directional strong directional gripping is desirable. In the embodiments, disclosed herein the difference between pull-off force and friction in the gripping direction can be up to 40 times.

Also, in the gripping direction, microplates exhibit anisotropic adhesive behavior, as evidenced by the existence of a pull-off peak at the end of the LDP cycle. While the disclosed systems and methods will be instrumental in the production of the next generation of efficient, reusable dry adhesives without using expensive cleanroom facilities, the curved microplates also show promise as naturally inspired highly efficient friction materials. In addition, the methods and systems provide cheaper adhesive production than current methods. The methods and systems provide higher precision in fabricating adhesive fibers, and provide the ability to fabricate adhesive materials over larger areas.

Based on the foregoing, it can be appreciated that a number of embodiments, preferred and alternative, are disclosed herein. It will be appreciated that variations of the above-disclosed and other features and functions, or alternatives thereof, may be desirably combined into many other different systems or applications. For example, in an embodiment, a fabrication method comprises forming a master mold, deforming fibers in the master mold into a selected shape, removing fibers from the master mold, casting fibers from the master mold, and removing the cast fibers from the master mold, the cast fibers comprising a microplate.

In an embodiment, the method further comprises aligning a microscope stage with the microplate.

In an embodiment, deforming the fibers in the master mold further comprises at least one of normal deformation and transverse deformation.

In an embodiment, the method further comprises curing the master mold. In an embodiment, forming the master mold comprises forming an array of fibers comprising a microplate array. In an embodiment, the method further comprises curing the fibers cast from the master mold.

In another embodiment a gripping system comprises a substrate and a curved microplate formed on the substrate.

In an embodiment, the gripping system further comprises a plurality of the curved microplates formed on the substrate. In an embodiment, the gripping system further comprises an array of the curved microplates formed on the substrate. In an embodiment, the gripping system further comprises the array of the curved microplates formed on the substrate further comprises a plurality of aligned rows of the curved microplates formed on the substrate and a plurality of aligned columns of the curved microplates formed on the substrate.

In an embodiment, the gripping system further comprises a crack tip associated with the curved microplate wherein the crack tip experiences a positive moment during peeling and a negative moment during sliding.

In an embodiment, the curved microplate is formed of polyurethane.

In an embodiment, the curved microplate has a gripping direction, the gripping direction being substantially opposite the direction of the curve in the curved microplate. In an embodiment, the curved microplate has a releasing direction, the releasing direction being substantially in line with the direction of the curve in the curved microplate.

In yet another embodiment, a gripping method comprises configuring a system comprising a substrate with at least one curved microplate formed thereon, applying the system to a target substrate, and sliding the system in a gripping direction while the system is in contact with the target substrate.

In an embodiment, the at least one curved microplate further comprises an array of curved microplates wherein the array of the curved microplates formed on the substrate further comprises a plurality of aligned rows of the curved microplates formed on the substrate and a plurality of aligned columns of the curved microplates formed on the substrate.

In an embodiment, the gripping method further comprises imparting a positive moment on a crack tip associated with the curved microplate during peeling. In an embodiment, the gripping method further comprises imparting a negative moment on a crack tip associated with the curved microplate during sliding.

In an embodiment, the gripping direction is substantially opposite the direction of the curve in the curved microplate.

In an embodiment, the curved microplate has a releasing direction, the releasing direction being substantially in line with the direction of the curve in the curved microplate.

Also, it should be appreciated that various presently unforeseen or unanticipated alternatives, modifications, variations or improvements therein may be subsequently made by those skilled in the art which are also intended to be encompassed by the following claims.

What is claimed is:

1. A fabrication method comprising:
   forming a master mold comprising an array of vertical and aligned straight fibers;
   dispensing a castable material on a slide;
   flattening the castable material into a uniform layer on the slide with a drawdown bar;
   bringing the vertical and aligned straight fibers of the master mold down into contact with the slide, through the castable material on the slide;
   while the array of vertical and aligned straight fibers are in contact with the slide uniformly deforming each of the vertical and aligned straight fibers in the master mold into curved fibers in the master mold with vertical and lateral displacements of the master mold, wherein the curved fibers in the master mold are forced into a selected curved shape;
   removing the curved fibers in the master mold from the castable material on the slide thereby forming a microplate array master mold;
   casting a curved fiber array from said microplate array master mold; and
   removing said cast curved fiber array from said microplate array master mold, said cast curved fiber array comprising an array of curved microplates.

2. The fabrication method of claim 1 further comprising:
   aligning the slide with the array of vertical and aligned straight fibers with a microscope stage.

3. The fabrication method of claim 1 wherein uniformly deforming each of the vertical and aligned straight fibers in the master mold into curved fibers further comprises at least one of:
   normal deformation; and
   transverse deformation, while tips of the vertical and aligned straight fibers are in contact with the glass slide.

4. The fabrication method of claim 1 further comprising:
   after uniformly deforming each of the vertical and aligned straight fibers in the master mold into curved fibers in the master mold with vertical and lateral displacements of the master mold, wherein the curved fibers in the master mold are forced into a selected curved shape, curing the master mold for at least 24 hours at room temperature.

5. The fabrication method of claim 1 wherein said castable material comprises silicone rubber.

6. The fabrication method of claim 1 further comprising: curing said curved fiber array cast from said microplate array master mold.

* * * * *